United States Patent

Higashi et al.

(10) Patent No.: US 8,064,169 B2
(45) Date of Patent: Nov. 22, 2011

(54) SUSPENSION FOR DISC DRIVE

(75) Inventors: Tsukasa Higashi, Yokohama (JP);
Hidenori Ogawa, Yokohama (JP)

(73) Assignee: NHK Spring Co., Ltd., Yokohama-Shi (JP)

( * ) Notice: Subject to any disclaimer, the term of this patent is extended or adjusted under 35 U.S.C. 154(b) by 881 days.

(21) Appl. No.: 12/079,285

(22) Filed: Mar. 26, 2008

(65) Prior Publication Data

US 2008/0247093 A1 Oct. 9, 2008

(30) Foreign Application Priority Data

Mar. 30, 2007 (JP) ................................. 2007-094055

(51) Int. Cl.
*G11B 21/21* (2006.01)
*G11B 5/60* (2006.01)

(52) U.S. Cl. .................................................. 360/245.9
(58) Field of Classification Search ............... 360/245.9
See application file for complete search history.

(56) References Cited

U.S. PATENT DOCUMENTS

| | | | | |
|---|---|---|---|---|
| 5,854,724 A | * | 12/1998 | Inaba et al. | 360/245.9 |
| 5,978,177 A | * | 11/1999 | Takasugi | 360/245.9 |
| 6,046,887 A | | 4/2000 | Uozumi et al. | |
| 6,274,225 B1 | * | 8/2001 | Miyake et al. | 428/209 |
| 6,335,416 B1 | | 1/2002 | Nojiri et al. | |
| 6,350,844 B1 | | 2/2002 | Ono et al. | |
| 2004/0264057 A1 | * | 12/2004 | Iwahara et al. | 360/245.9 |
| 2005/0135015 A1 | * | 6/2005 | Schulz et al. | 360/245.9 |
| 2006/0190673 A1 | * | 8/2006 | Arai et al. | 711/101 |
| 2008/0192384 A1 | * | 8/2008 | Danielson et al. | 360/245.9 |

FOREIGN PATENT DOCUMENTS

| | | |
|---|---|---|
| JP | 8-102162 A | 4/1996 |
| JP | 11-213365 A | 8/1996 |
| JP | 11-39626 A | 2/1999 |
| JP | 2003-68803 A | 3/2003 |
| JP | 2003-155344 A | 5/2003 |
| JP | 2003-176370 A | 6/2003 |
| JP | 2005-183831 A | 7/2005 |
| JP | 2006-224571 A | 8/2006 |

OTHER PUBLICATIONS

Japanese Office Action dated Mar. 1, 2011 (and English translation thereof) in counterpart Japanese Application No. 2007-094054.

* cited by examiner

*Primary Examiner* — Will J Klimowicz
(74) *Attorney, Agent, or Firm* — Holtz, Holtz, Goodman & Chick, PC

(57) ABSTRACT

A suspension for a disc drive includes a base plate, a load beam, and a flexure. The flexure includes a metal base member and a circuit member disposed along the metal base member. The circuit member extends along the load beam. The circuit member includes a resin base member formed of a first polyimide, conductors, and a resin cover member formed of a second polyimide. The resin cover member is lower than the resin base member in humidity expansion coefficient.

6 Claims, 5 Drawing Sheets

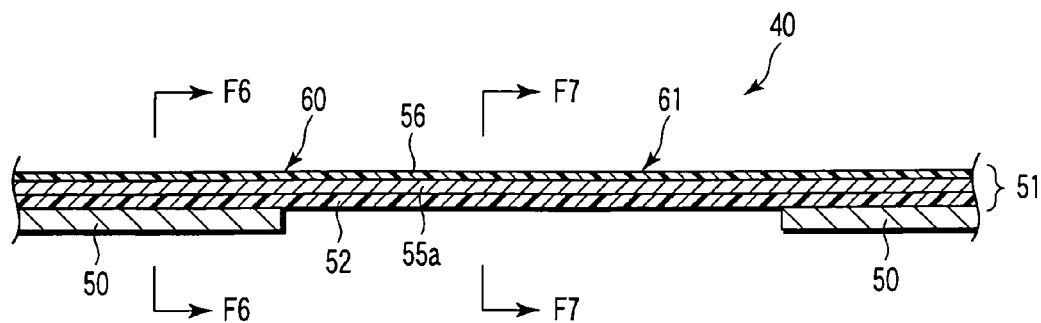
F I G. 5
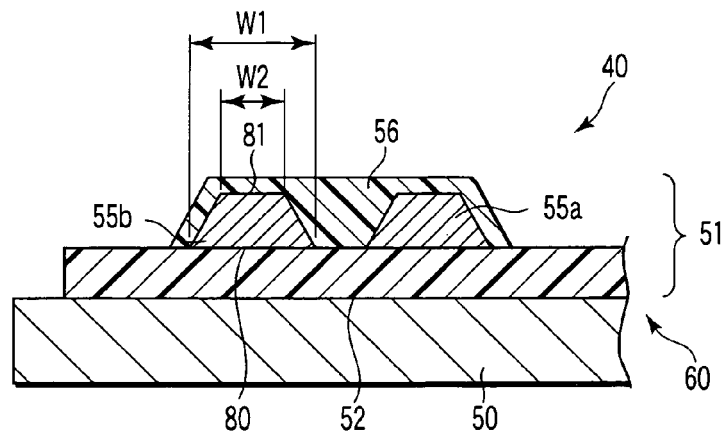
F I G. 6
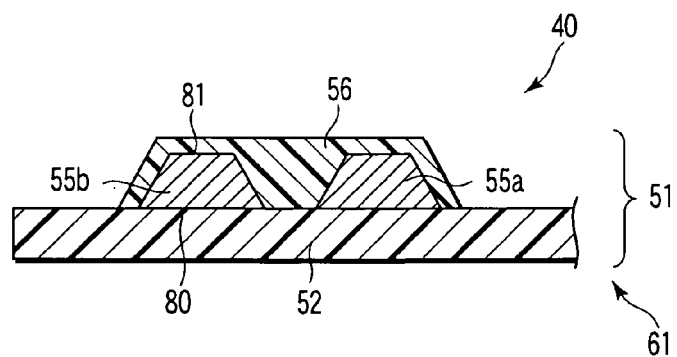
F I G. 7

US 8,064,169 B2

SUSPENSION FOR DISC DRIVE

CROSS-REFERENCE TO RELATED APPLICATIONS

This application is based upon and claims the benefit of priority from prior Japanese Patent Application No. 2007-094055, filed Mar. 30, 2007, the entire contents of which are incorporated herein by reference.

BACKGROUND OF THE INVENTION

1. Field of the Invention

The present invention relates to a suspension for a disc drive used in an information processing apparatus, such as a personal computer.

2. Description of the Related Art

A hard disc drive (HDD) is used in an information processing apparatus, such as a personal computer. The HDD includes a magnetic disc that rotates around a spindle, a carriage turnable around a pivot, etc. A suspension for the disc drive is disposed on an arm of the carriage.

The suspension for the disc drive includes a load beam fixed to the carriage, a flexure located overlapping the load beam, etc. A slider is mounted on a tongue portion that is formed on the flexure. The slider is provided with a transducer for reading or writing data.

Flexures of various forms have been put to practical use according to required specifications. As an example of these flexures, there is a flexure with conductors described in Jpn. Pat. Appln. KOKAI Publication No. 2005-183831. The flexure with conductors includes a metal base member formed of a thin stainless steel plate, a resin base member formed of an electrically insulating material, such as polyimide, a plurality of copper conductors, etc. The resin base member is formed on the metal base member. The conductors are formed on the resin base member and covered by a cover member formed of an electrically insulating material, such as polyimide.

A pitchwise inclination of the slider with the tongue portion of the flexure in a free state is called a pitch static attitude in the art. In order to achieve a predetermined performance of the suspension for the disc drive, variation of the pitch static attitude should be minimized.

The pitch static attitude varies depending on various factors. It is generally known that the pitch static attitude may fluctuate owing to, for example, a variation in the machining accuracy of the flexure or a temperature change. Studies by the inventors indicate that a flexure with conductors is more susceptible to humidity changes than one without. In the case of a flexure with conductors in which a photosensitive polyimide is used for a resin cover member of a circuit member, in particular, the pitch static attitude sometimes may considerably vary in sensitive response to humidity changes.

BRIEF SUMMARY OF THE INVENTION

The object of the present invention is to provide a suspension for a disc drive, in which an influence of a change of humidity on the pitch static attitude of a slider can be reduced.

The present invention is a suspension for a disc drive, which comprises a base plate, a load beam, and a flexure which is disposed along the load beam and includes a slider on a distal end portion thereof. In this suspension, the flexure includes a metal base member and a circuit member which is disposed along the metal base member, extends along the load beam, and is electrically connected to the slider. The circuit member includes a resin base member which is formed of a first polyimide and at least a part of which is laminated to the metal base member, conductors laminated on the resin base member, and a resin cover member which is formed of a second polyimide and covers the conductors. The resin cover member is lower than the resin base member in humidity expansion coefficient.

In the suspension for a disc drive provided with the flexure with conductors, formed of the metal and resin base members, conductors, resin cover member, etc., according to the invention, an influence of a change of humidity on the pitch static attitude of the slider can be reduced, so that a great effect can be produced in restricting the pitch static attitude of the slider within an allowable range.

If the difference in humidity expansion coefficient between the resin base member and the resin cover member is 3 ppm/% RH or less, according to the invention, a change of the pitch static attitude can be made small enough.

For example, the first and second polyimides are non-photosensitive polyimides including no photosensitive groups. The flexure may include a portion in which the metal base member and the circuit member overlap each other and a portion formed of the circuit member only.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a partial sectional view of a part of the flexure shown in FIG. 4, taken along its axis;

FIG. 6 is a sectional view of a part of the flexure taken along line F6-F6 of FIG. 5;

FIG. 7 is a sectional view of a part of the flexure taken along line F7-F7 of FIG. 5;

DETAILED DESCRIPTION OF THE INVENTION

A suspension for a disc drive according to an embodiment of the present invention will now be described with reference to FIGS. 1 to 8.

Figure 1:
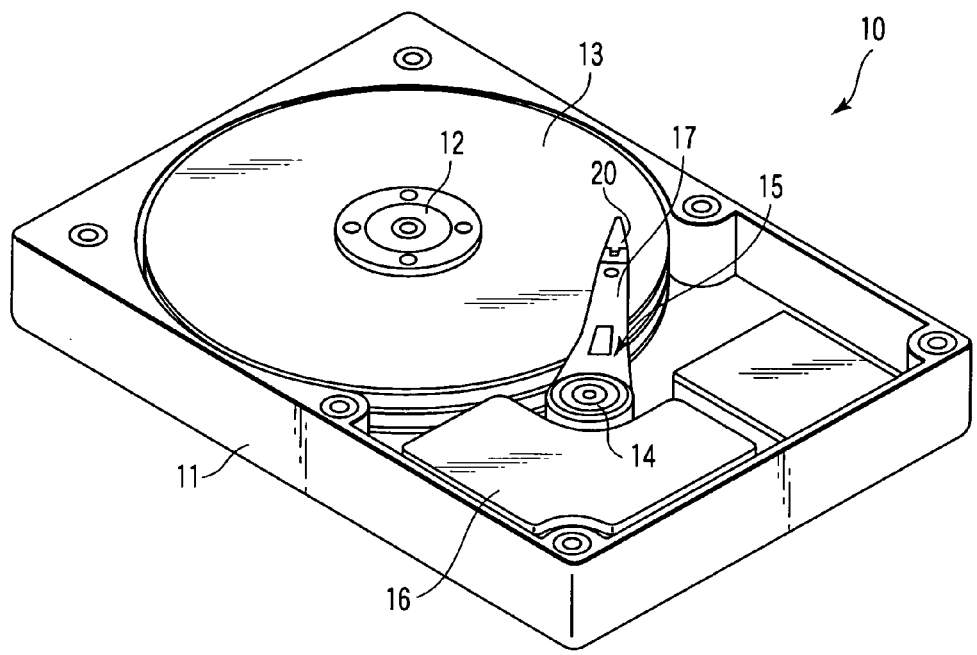
FIG. 1 is a perspective view of a disc drive provided with a suspension according to an embodiment of the invention.

A hard disc drive (HDD) 10 shown in FIG. 1 includes a case 11, discs 13, a carriage 15, a positioning motor 16, etc. The discs 13 rotate around a spindle 12. The carriage 15 is turnable about a pivot 14. The positioning motor 16 drives the carriage 15. The case 11 is covered by a lid (not shown).

Figure 2:
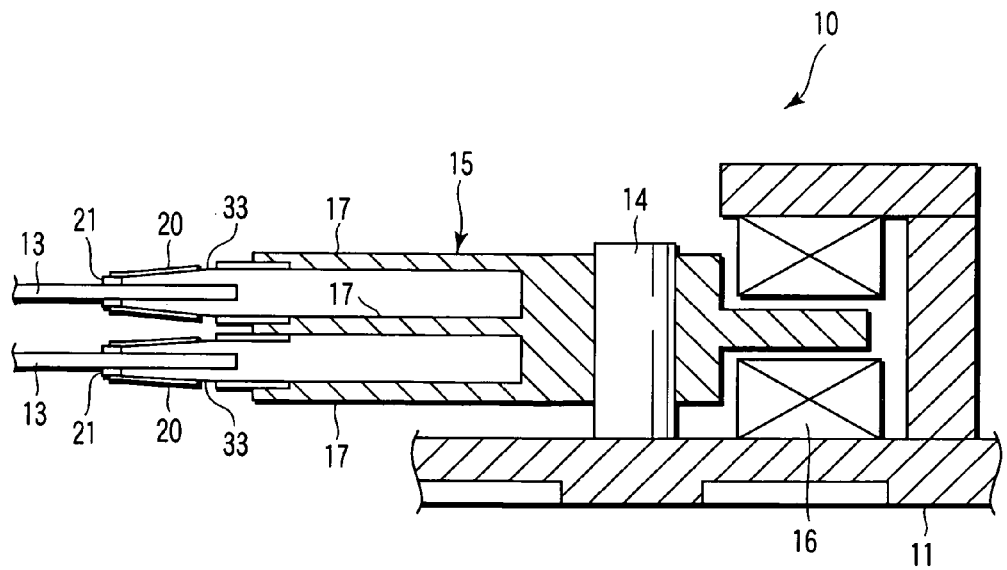
FIG. 2 is a sectional view of a part of the disc drive shown in FIG. 1.

FIG. 2 is a sectional view schematically showing a part of the disc drive 10. As shown in FIG. 2, the carriage 15 is provided with arms 17. A suspension 20 is attached to the distal end portion of each arm 17. A slider 21 that forms a magnetic head is disposed on the distal end of the suspension 20. When each disc 13 rotates at high speed, an air bearing is formed between the disc 13 and the slider 21. When the carriage 15 is turned by the positioning motor 16, the suspension 20 moves radially across the disc 13, whereupon the slider 21 moves to a position corresponding to a desired track of the disc 13.

Figure 3:
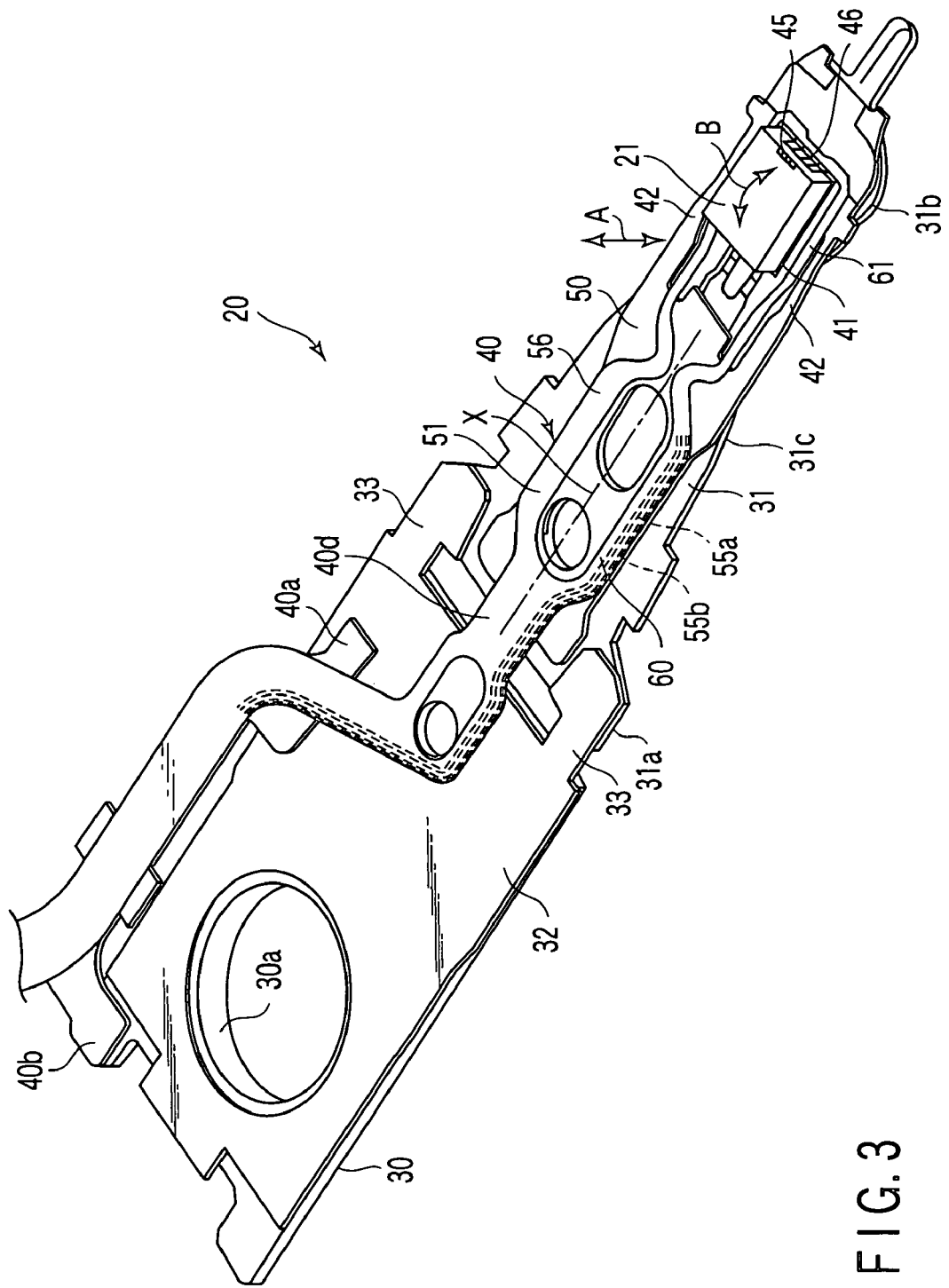
FIG. 3 is a perspective view of the suspension used in the disc drive of FIG. 1.

FIG. 3 shows an example of the suspension 20. This suspension 20 is provided with a base plate 30, a load beam 31, a hinge member 32 formed of a thin plate spring, a flexure 40 with conductors, etc. A boss portion 30a of the base plate 30 is fixed to the arm 17 of the carriage 15.

The load beam 31 includes a base portion 31a fixed to the hinge member 32, a tip portion 31b situated near the slider 21, a longitudinally intermediate portion 31c, etc. The hinge member 32 is provided with a pair of spring portions 33. The spring portions 33 are formed between the base plate 30 and the load beam 31. The spring portions 33 are bendable thicknesswise. The load beam 31 can be elastically displaced in the direction indicated by arrow A in FIG. 3 around a region near the spring portions 33, with respect to the base plate 30 on the stationary side. In the present embodiment, the spring portions 33 are formed on the hinge member 32. In the case of a suspension without the hinge member 32, spring portions bendable thicknesswise may be formed on a part of a load beam.

The flexure 40 extends along an axis X (shown in FIG. 3) of the load beam 31. In other words, the flexure 40 extends along the load beam 31. A part of the flexure 40 overlaps the load beam 31 and is fixed to the load beam 31 by fixing means, such as laser welding. A portion 40a of the flexure 40 that is situated near the base plate 30 is fixed to the hinge member 32. A rear portion 40b of the flexure 40 is fixed to the base plate 30. A part 40d of the flexure 40 extends between the pair of spring portions 33 so as to bridge the base plate 30 and the load beam 31.

Figure 4:
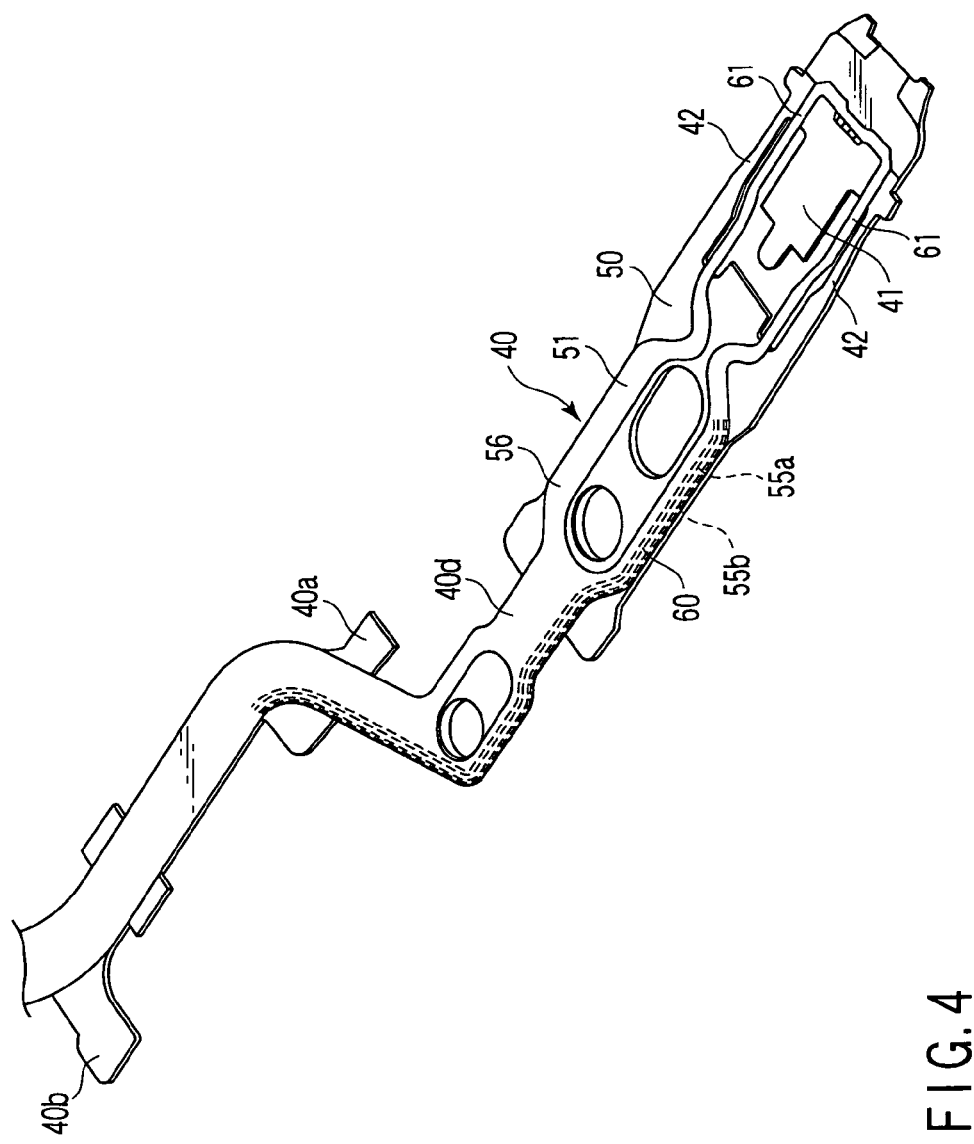
FIG. 4 is a perspective view of a flexure of the suspension shown in FIG. 3.

FIG. 4 is a perspective view of the flexure 40. A tongue portion (gimbals portion) 41 and a pair of outrigger portions 42 are disposed near the distal end portion of the flexure 40. The outrigger portions 42 are situated individually on the opposite sides of the tongue portion 41. The slider 21 (shown in FIG. 3) is mounted on the tongue portion 41. The slider 21, which functions as the magnetic head, is provided with a transducer portion 45 (shown in FIG. 3), a pad portion 46, etc. The transducer portion 45 is provided with read elements and write elements. The pad portion 46 functions as a connection terminal.

FIG. 5 schematically shows a section of a part of the flexure 40 along the axis X. FIGS. 6 and 7 are sectional views of different parts of the flexure 40 perpendicular to the axis X. The flexure 40 includes a metal base member 50 and a circuit member 51. The metal base member 50 is formed of a thin, elastic stainless steel plate. The circuit member 51 is formed along the metal base member 50.

The circuit member 51 is composed of a resin base member 52, a plurality of conductors 55a and 55b formed on the resin base member 52, a resin cover member 56, etc. The resin cover member 56 is thinner than the resin base member 52. The conductors 55a and 55b are covered by the cover member 56. Although only the two conductors 55a and 55b are illustrated, the flexure 40 according to the present embodiment is also provided with other conductors (not shown). The conductors may, for example, be a pair of conductors for data reading, a pair of conductors for data writing, heater conductors formed as required, etc.

The conductors 55a and 55b are made of deposited copper. They are formed on the resin base member 52. Each of the conductors 55a and 55b is formed by etching into a desired circuit pattern along the flexure 40. In FIGS. 3 and 4, the respective circuit patterns of the conductors 55a and 55b are partially indicated by broken lines. The respective distal ends of the conductors 55a and 55b are connected to the pad portion 46 of the slider 21. The other ends of the conductors 55a and 55b are connected to an amplifier of the disc drive 10 through a terminal area (not shown).

The flexure 40 includes a portion 60 in which the metal base member 50 and the circuit member 51 overlap each other. FIG. 6 schematically shows a section (taken perpendicular to the axis X) of the portion 60.

The flexure 40 includes circuit-member-only portions 61 (without the metal base member 50) that are provided with the circuit member 51 only. FIG. 7 schematically shows a section (taken perpendicular to the axis X) of one of the portions 61. As shown in FIG. 3, for example, the portions 61 are formed in those regions of the entire flexure 40 which are situated near the slider 21 and extend individually along side faces of the slider 21. Thus, the circuit-member-only portions 61 are formed individually along the outrigger portions 42. The portions 61 are formed by removing a part of the metal base member 50 by etching.

As shown in FIGS. 6 and 7, each of the conductors 55a and 55b is formed by etching a layer of the deposited copper so that its thicknesswise section is trapezoidal. In the thicknesswise section of each of the conductors 55a and 55b, a width W1 of a surface 80 that faces the resin base member 52 is greater than a width W2 of a surface 81 on the side opposite from the resin base member 52. The thicknesswise section of each of the conductors 55a and 55b is trapezoidal. Therefore, the bending stiffness of the circuit member 51 of the present embodiment is lower than that of the circuit member that has the rectangular-profiled conductors, and the peel strength of the conductors 55a and 55b is high. The thicknesswise section of each of the conductors 55a and 55b may be square or rectangular, for example.

The resin base member 52 is formed of a first polyimide as an electrically insulating first resin. An example of the first polyimide is a non-photosensitive polyimide, which has a first humidity expansion coefficient. The first humidity expansion coefficient is, for example, 10.7 ppm/% RH. For example, 1 ppm/% RH indicates that the polyimide changes by 1 ppm when the relative humidity changes by 1%.

The resin cover member 56 is formed of a second polyimide as an electrically insulating second resin. An example of the second polyimide is a non-photosensitive polyimide, which has a second humidity expansion coefficient. The second humidity expansion coefficient is, for example, 8.0 ppm/% RH. The resin cover member 56 is formed on the conductors 55a and 55b by a film forming process that is different from that for the resin base member 52. Thus, the polyimide for the resin cover member 56, which depends on the film forming process, is different from that for the resin base member 52. In the present embodiment, the difference in humidity expansion coefficient between the resin base and cover members 52 and 56 can be reduced by using the non-photosensitive polyimides individually for the members 52 and 56.

The humidity expansion coefficient (second humidity expansion coefficient) of the resin cover member 56 is lower than that (first humidity expansion coefficient) of the resin base member 52. If the resin base and cover members 52 and 56 are subjected to the same humidity, therefore, the degree of expansion of the cover member 56 by moisture absorption is lower than that of the base member 52.

Figure 8:
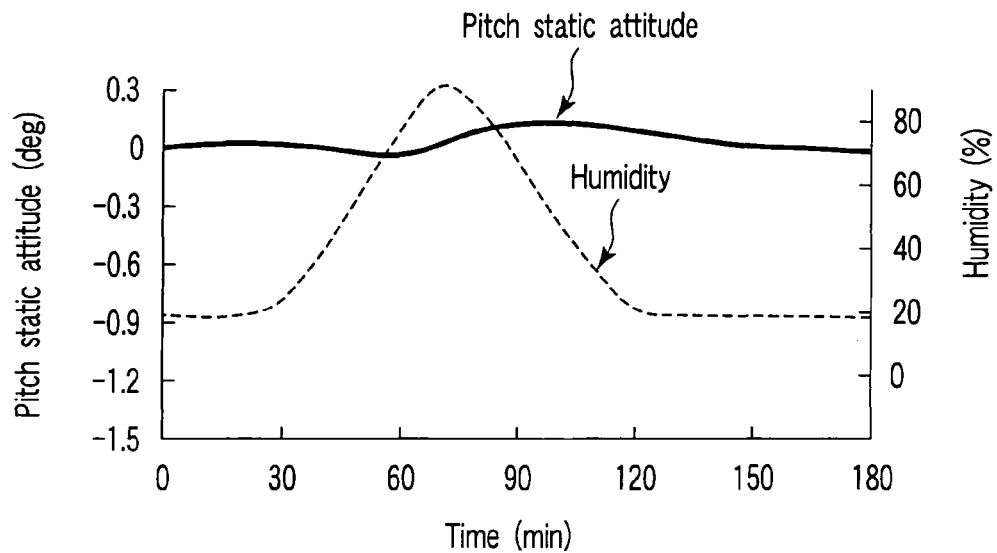
FIG. 8 is a diagram showing the relationship between the humidity and pitch static attitude of the suspension shown in FIG. 3.

FIG. 8 shows the result of measurement of a change of the pitch static attitude of the suspension 20 with the flexure 40 of the present embodiment observed when the humidity is changed with the temperature kept constant (40° C.). The pitch static attitude is the inclination of the slider 21 in the direction indicated by arrow B in FIG. 3. The humidity expansion coefficient of the resin base member 52 is 10.7 ppm/% RH, while that of the resin cover member 56 is 8.0 ppm/% RH. Thus, the difference in humidity expansion coefficient between the base and cover members 52 and 56 is 2.7 ppm/% RH. As shown in FIG. 8, it was confirmed that the pitch static attitude of the suspension 20 with the flexure 40 of the present embodiment hardly changed despite the change of the humidity.

According to the present embodiment, the humidity expansion coefficient of the resin cover member 56 is lower than that of the resin base member 52. The metal base member 50 is laminated to a part of the resin base member 52. Specifically, the resin base member 52 is fixed to the metal base member 50 that is stiffer than polyimide. Thus, the metal base member 50 can restrain the resin base member 52 from expanding because of moisture absorption. On the other hand, the resin cover member 56 is separated thicknesswise from the metal base member 50 and laminated on the outermost side of the circuit member 51. Accordingly, the expansion of the resin cover member 56 by moisture absorption is liable to cause warping of the circuit member 51.

In the present embodiment, the polyimides of two types (first and second polyimides) are combined so that the humidity expansion coefficient of the resin cover member 56 is lower than that of the resin base member 52. Thus, the circuit member 51 was able to be prevented from being warped by moisture absorption. In consequence, an influence of the warp of the circuit member 51 on the tongue portion 41 was able to be suppressed, so that the change of the pitch static attitude of the slider 21 was able to be reduced. When the difference in humidity expansion coefficient between the resin base and cover members 52 and 56 was higher than 3 ppm/% RH, the change of the pitch static attitude became too large for practical use as the humidity changed. Thus, the difference in humidity expansion coefficient between the resin base and cover members 52 and 56 is expected to be 3 ppm/% RH or less.

Figure 9:
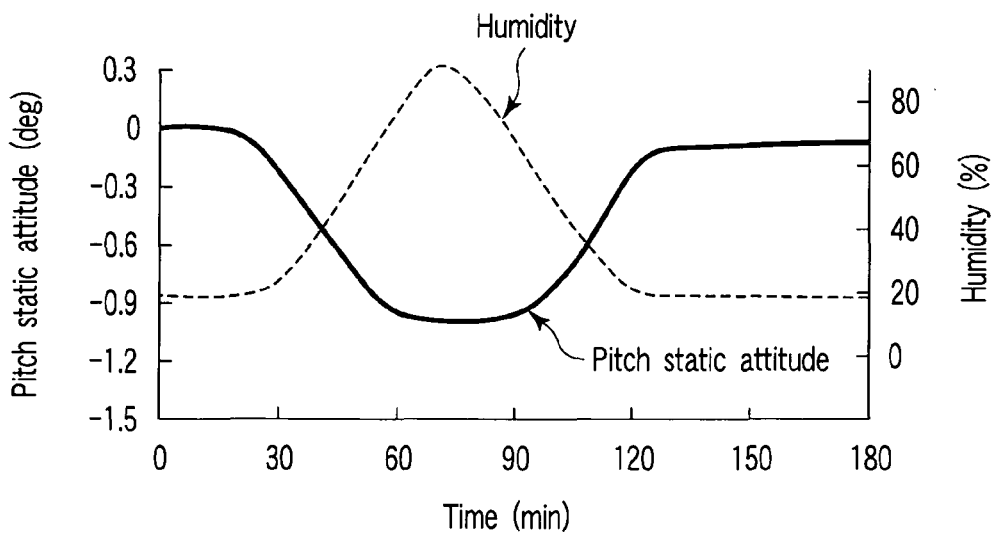
FIG. 9 is a diagram showing the relationship between the humidity and pitch static attitude of a conventional suspension.

FIG. 9 shows the result of measurement of a change of the pitch static attitude of a suspension of a comparative example (prior art example) observed when the humidity is changed with the temperature kept constant (40° C.). A resin base member is formed of a non-photosensitive polyimide, which has a humidity expansion coefficient of 10.7 ppm/% RH. A resin cover member is formed of a photosensitive polyimide, which has a humidity expansion coefficient of 55.0 ppm/% RH. The difference in humidity expansion coefficient between the resin base and cover members is 44.3 ppm/% RH. The suspension of the comparative example was found to be unpractical because the pitch static attitude changes by nearly 1 degree when the humidity changes, as shown in FIG. 9.

In the comparative example described above, the humidity expansion coefficient of the resin cover member is higher than that of the resin base member. While the resin base member is laminated to a metal base member, the resin cover member is separated thicknesswise from the metal base member and situated on the outermost side of a circuit member. According to the comparative example, therefore, the circuit member warped as the resin cover member, which is higher than the resin base member in humidity expansion coefficient, extended. In the comparative example described above, the warping of the circuit member influenced a tongue portion, thereby considerably changing the pitch static attitude.

It is to be understood, in carrying out the invention, that its components, including the metal base member, circuit member, resin base member, resin cover member, conductors, etc., which constitute the flexure, as well as the base plate and the load beam, may be embodied in modified forms without departing from the scope or spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A suspension for a disc drive, comprising:
  a base plate;
  a load beam; and
  a flexure which is disposed along the load beam and includes a slider on a distal end portion thereof,
  wherein the flexure includes a metal base member and a circuit member which is disposed along the metal base member, extends along the load beam, and is electrically connected to the slider,
  wherein the circuit member includes a resin base member which is formed of a first polyimide and at least a part of which is laminated to the metal base member, conductors laminated on the resin base member, and a resin cover member which is formed of a second polyimide and covers the conductors,
  wherein the second polyimide of the resin cover member has a lower humidity expansion coefficient than the first polyimide of the resin base member.

2. A suspension for a disc drive according to claim 1, wherein the difference in humidity expansion coefficient between the first polyimide of the resin base member and the second polyimide of the resin cover member is 3 ppm/% RH or less.

3. A suspension for a disc drive according to claim 2, wherein the first and second polyimides are non-photosensitive polyimides.

4. A suspension for a disc drive according to claim 3, wherein the flexure includes a portion in which the metal base member and the circuit member overlap each other and a portion formed of the circuit member only.

5. A suspension for a disc drive according to claim 2, wherein the flexure includes a portion in which the metal base member and the circuit member overlap each other and a portion formed of the circuit member only.

6. A suspension for a disc drive according to claim 1, wherein the flexure includes a portion in which the metal base member and the circuit member overlap each other and a portion formed of the circuit member only.

* * * * *